United States Patent Office 3,645,919
Patented Feb. 29, 1972

---

3,645,919
COPOLYMERS FROM PHOSPHINE OXIDE ANHYDRIDES
Al F. Kerst, Littleton, Colo., assignor to Monsanto Company, St. Louis, Mo.
No Drawing. Continuation-in-part of application Ser. No. 832,410, June 11, 1969. This application Oct. 20, 1970, Ser. No. 82,534
Int. Cl. C08g 33/16, 33/20
U.S. Cl. 260—2 P        12 Claims

ABSTRACT OF THE DISCLOSURE

Polymers prepared by copolymerizing a reactive hydrogen-containing material from the group polyhydric compounds and polyamine compounds with a full anhydride of an organoalkylidene phosphonyl phosphine oxide having the formula:

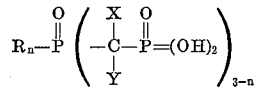

wherein R, X, Y and $n$ are defined in the specification.

---

The present application is a continuation-in-part of my co-pending application, Ser. No. 832,410, filed June 11, 1969, now abandoned.

This invention relates to organic polymeric compositions and, more particularly, provides novel polymers having increased resistance to burning and a method for rendering polymeric compositions flame retardant.

It is an object of this invention to provide new and useful polymeric compositions.

It is another object of this invention to provide methods for increasing the resistance of organic polymeric compositions to the action of flames and for making them more resistant to burning action in general plastic application; for example, when such compositions are used in children's toys.

An additional object of this invention is to provide in polymer compositions an organic phosphorus compound having reduced tendency to decomposed and/or degrade from the polymer compositions when the polymer system is subjected to elevated temperatures.

Another aspect of this invention provides, as new compositions of matter, synthetic copolymeric materials prepared using as a comonomer an anhydride of an organoalkylidene phosphonyl phosphine oxide as defined herein.

Other objects, advantages, and aspects of this invention will become apparent from a reading of the specification and the appended claims.

The full anhydrides of organo-alkylidene phosphonyl phosphine oxides which are added to, blended with, or copolymerized with the synthetic polymeric materials to accomplish the above stated objects and aspects are disclosed and described as well as methods for preparing the same in co-pending application Ser. No. 832,491, of Al F. Kerst, entitled "Anhydrides of Organo-Alkylidene Phosphonyl Phosphine Oxides," filed June 11, 1969, which is incorporated herein by reference.

The organic phosphorus compounds which are useful in the present invention are full or complete anhydrides of organo-alkylidene phosphonyl phosphine oxides having the formula:

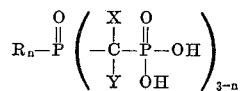

wherein: $n$ is an integer 0 to 1, X and Y are selected from the group consisting of hydrogen and alkyl groups containing from 1 to 6 carbon atoms and R is selected from the group consisting of hydrogen, aliphatic, aryl, alkaryl, aralkyl, alicyclic, and

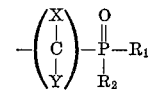

wherein $m$ is an integer from 1 to 10, and $R_1$ and $R_2$ are each selected from the group consisting of hydrogen, alkyl groups containing from 1 to 6 carbon atoms,

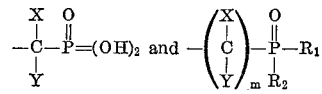

and R does not contain over 6

groups, i.e. phosphine oxide moieties in the straight chain, for example,

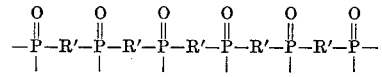

where R′ is an organic group either substituted or unsubstituted.

As used herein, the term "anhydride(s) of organoalkylidene phosphonyl phosphine oxide(s)" generically described all of the foregoing. Anhydrides of organoalkylidene phosphonyl phosphine oxides can be generally characterized by containing at least one anhydride (P—O—P) group per molecule.

In the foregoing general formula, although X and Y are preferably hydrogen, when X and Y represent alkyl groups, the groups may be branched or straight chained and when R represents aliphatic groups, the groups may be branched or straight chained as well as being saturated (alkyl) or unsaturated although it is preferred that if the groups are unsaturated they be ethylenically unsaturated and especially preferred are mono-ethylenically unsaturated (alkenyl) groups. Additionally, when R represents groups containing alkyl moieties, i.e., aralkyl gorups and the like, such carbon chains may be of a straight chain structure or branched chain structure and it is preferred that such contain from 1 to about 20 carbon atoms. When R represents alicyclic (including saturated heterocyclic) groups such are preferably 5 and 6 membered mono-cyclic alicyclic groups (cyclopentyl and cyclohexyl). When R represents aryl groups or groups containing aryl moieties, i.e., alkaryl groups and the like, such groups are preferably mono-cyclic or dicyclic groups containing from 6 to 10 carbon atoms and especially preferred is the mono-cyclic group containing 6 carbon atoms (phenyl). In addition, the foregoing mentioned hydrocarbyl groups may contain substituent groups, such as, halides (fluoride, chloride, bromide and iodide), alkoxy groups, sulfonyl groups, and the like. Although the hydrocarbyl groups can contain a plurality of such substituent groups it is preferred that they contain only one such substituent group per hydrocarbyl group. For most end use applications the compounds of the instant invention should preferably contain not more than 25 carbon atoms associated with $R_1$ and $R_2$, and there are few, if any, end uses in which the foregoing groups contain more than a total of 50 carbon atoms.

In conjunction with the definitions of R, $R_1$ and $R_2$ above, the preferred organic substituents are the following:

(a) alkyl—containing from about 1 to about 18 carbon atoms;

(b) alkenyl—containing from about 1 to about 18 carbon atoms;

(c) aryl—phenyl, naphthyl, anthryl or phenanthryl;
(d) alkyl aryl (alkaryl)—hydroxy, halogen, lower alkyl, having from 1 to about 6 carbon atoms, and amino substituted phenyl, naphthyl, anthryl, or phenanthryl;
(e) cyclic—containing from about 4 to about 8 carbon atoms and there may be present in the ring either a nitrogen, sulfur, oxygen, or phosphorus atom; and
(f) alicyclic—containing from about 4 to about 10 carbon atoms.

In general, the full anhydrides of the organo-alkylidene phosphonyl phosphine oxides can be prepared by the process of reacting an organo-alkylidene phosphonyl phosphine oxide per se (as defined above) with an organic carboxylic anhydride, such as acetic anhydride, at temperatures above about 40° C. and preferably at reflux temperatures for a time sufficient to prepare the desired anhydride product.

Particularly preferred full anhydride compounds of the instant invention include the tri (lower alkylidene phosphonyl) phosphine oxide anhydrides, that is, anhydrides of tri (lower alkylidene phosphonyl) phosphine oxides having the formula:

(II) 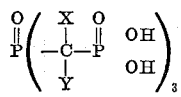

wherein X and Y are selected from the group consisting of hydrogen and alkyl groups containing from 1 to 6 carbon atoms.

A complete or full anhydride of tri (lower alkylidene phosphonyl) phosphine oxide of Formula II above is believed to have the following structure:

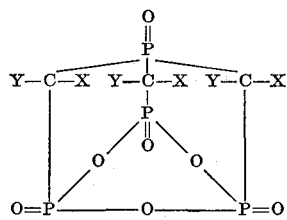

Particularly preferred full anhydride compounds of the instant invention include the alkyl di(lower alkylidenephosphonyl) phosphine oxide anhydrides, that is, anhydrides of alkyl di(lower alkylidene phosphonyl) phosphine oxides having the formula:

(III) 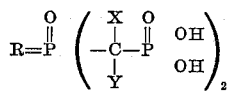

wherein: X and Y are selected from the group consisting of hydrogen and alkyl groups containing from 1 to 6 carbon atoms and R is an alkyl group containing from 1 to 20 carbon atoms.

Particularly preferred full anhydride compounds of the instant invention include the alkylene tetra(methylphosphonyl) bis(phosphine oxide) anhydrides, that is anhydrides of alkylene tetra(methylphosphonyl) bis phosphine oxides having the formula:

(IV) 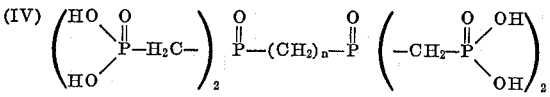

wherein: n is an integer from 1 to 10 inclusive.

The anhydrides of organo-alkylidene phosphonyl phosphine oxides exhibit several unique and/or distinctive properties which include a distinct increase, usually greater than 5° C. and in some cases greater than 50 to 150° C. or more, in the melting point (which may in some instances be a decomposition point) for the anhydride of a particular organo-alkylidene phosphonyl phosphine oxide over the corresponding acid form of the organo-alkylidene phosphonyl phosphine oxide as well as a rate of reversion to said corresponding acid form of greater than about 1 gram per hour when 10 grams of the anhydride per se are slurried in 100 cc. of water for 1 hour at 35° C.

Non-limiting examples of anhydride compounds suitable for use in the present invention include anhydrides of the following organo-alkylidene phosphonyl phosphine oxides:

tri(methylphosphonyl) phosphine oxide
dodecyl di(methylphosphonyl) phosphine oxide
pentamethylene tetra(methylphosphonyl) bis(phosphine oxide)
tri(ethylidene phosphonyl) phosphine oxide
methyl di(methylphosphonyl) phosphine oxide
decyl di(methylphosphonyl) phosphine oxide
tetradecyl di(methylphosphonyl) phosphine oxide
methyl di(butylidene phosphonyl) phosphine oxide
ethylene tetra (methylphosphonyl) bis(phosphine oxide)
ethanol di(methylphosphonyl) phosphine oxide
phenyl di(methylphosphonyl) phosphine oxide
cyclohexyl di(methylphosphonyl) phosphine oxide
cyclopentyl di(methylphosphonyl) phosphine oxide
naphthyl di(methylphosphonyl) phosphine oxide
hexylphenyl di(methylphosphonyl) phosphine oxide
dodecylphenyl di(methylphosphonyl) phosphine oxide
phenyloctyl di(methylphosphonyl) phosphine oxide
phenyltetradecyl di(methylphosphonyl) phosphine oxide
phenylethyl di(methylphosphonyl) phosphine oxide
oleyl di(methylphosphonyl) phosphine oxide
trimethylene tetra(methylphosphonyl) bis(phosphine oxide)
hexamethylene tetra(methylphosphonyl) bis(phosphine oxide)
decamethylene tetra(methylphosphonyl) bis(phosphine oxide)
ethylene tri(methylphosphonyl) bis(phosphine oxide)
ethylene penta(methylphosphonyl) tris(phosphine oxide)
triethylene hexa(methylphosphonyl) tetra kis(phosphine oxide)

The presently provided anhydrides of organo-alkylidene phosphonyl phosphine oxide are useful as modifiers as well as flame retardants for synthetic polymeric materials. The present anhydrides of organo-alkylidene phosphonyl phosphine oxides may be use in a quantity which is equal to that of the polymer, but in most instances favorable results with respect to improvement in flame-retardance are obained at concentrations which are definitely lower. In some cases amounts as little as 0.1%, by weight of polymer and anhydride, may be used, although generally it is preferred that amounts of from about 1% to 50% be used to provide polymeric systems with reduced burning rates. Use of the present invention anhydrides with the polymeric materials in quantities which confer beneficial properties to the polymers with respect to a desired effect, i.e., flame retardance, often confers to the polymer an improvement also in such characteristics as resistance to impact, dimensional stability, moldability, dye receptivity and the like. Hence, in order to arrive at optimum beneficial effect suited to the purposes for which the polymeric composition is designed, only routine testing, involving variation of adjuvant quantity is generally required, although in some instances one or more members of the whole class of the present invention anhydrides will be found to impart a degree of modification at a low concentration which can be attained by other members of the class at significantly higher concentrations.

The flammability test for measuring the burn qualities of polymer samples is for the most part essentially the standard burn test known as ASTM–D1692–D59T or modifications thereof. As used herein a polymeric composition is considered "non-burning" if there is no evidence of burning (flame or progressive glow) after removal of the burner and a "self-extinguishing" sample is one that continues to burn after removal of the burner but the flame goes out before the second gauge line is reached.

In general, the anhydrides of organo-alkylidene phosphonyl phosphine oxide can be used as a comonomer in place of or in combination of other conventionally used dibasic or polybasic carboxylic anhydrides, such as phthalic and maleic anhydride, to form synthetic polymeric systems. The anhydrides, for example, can undergo reactions with reactive hydrogen-containing materials which include polyamines containing at least two amine groups with a reactive hydrogen on each group and polyhydroxyl-containing organic compounds (containing at least two hydroxyl groups with a reactive hydrogen on each group) including polyhydric alcohols, phenols and the like. A distinct advantage of the present invention, therefore, is the flexibility which the phosphine oxide anhydrides exhibit in formulating and preparing polymeric compositions. For example, they can be used with preformed monomers, copolymers, and the like, or they can be used as a comonomer to form polymers with other appropriate monomer materials.

In general, the polyhydric alcohols which are useful in preparing polymers by reaction with the phosphine oxide anhydrides include glycerol, pentaerythritol (including di- and tripentaerythritol), sorbitol, mannitol, and the glycols (including the alkylene glycols and the polyalkylene glycols in which the alkylene group is $(-CH_2-)_n$ wherein $n$ is an integer from 2 to 10), such as ethylene glycol, propylene glycol, butylene glycol, diethylene glycol, dipropylene glycol, triethylene glycol, tetraethylene glycol, hexamethylene glycol, decamethylene glycol and the like.

In general, the polyamines which are useful in preparing polymers by reaction with the phosphine oxide anhydrides include the alkylene polyamines (particularly the alkylene diamine, triamine and tetraamines in which the alkylene group is $(-CH_2-)_n$ where in $n$ is an integer from 2 to 10) such as ethylene diamine, diethylene diamine, hexamethylene diamine, decamethylene diamine, triethylene tetraamine, pentamethylene triamine, hexamethylene tetraamine, butylene diamine, and the like.

Usually, all that is necessary is to mix the phosphine oxide anhydride and polyamine and/or polyhydric organic compounds preferably in amounts of about one P—O—P (phosphonic anhydride) group per amine or hydroxyl group, although amounts on a phosphonic anhydride group to amine or hydroxyl group ratio of from about 1:10 to 10:1 can be used, and heat to elevated temperatures, such as from about 40° C. to the melting point of the reactants (under atmospheric pressure, although sub-atmospheric pressures as well as pressures in excess of atmospheric can be used) with temperatures above about 90° C. being preferred. In addition, it is sometimes advantageous to employ an inert liquid non-aqueous reaction medium such as paraffin hydrocarbons, benzene, toluene, xylene, acetone, dimethyl formamide and the like and after polymerization removing the medium such as by distillation and/or decantation in order to recover the polymer.

Synthetic polymeric materials, i.e., those high molecular weight organic materials which are not found in nature, with which the present invention anhydrides are advantageously employed may be either linear or cross-linked polymers and they may be either those which are produced by addition polymerization or by condensation.

An important class of polymers which are beneficially modified according to the invention are those obtained from a polymerizable monomer compound having ethylenic unsaturation.

A particularly preferred class of polymers flameproofed hereby consists of the polymerized vinyl and vinylidene compounds, i.e., those having the $CH_2=C<$ radical. Compounds having such a radical are, e.g., the solid polymeric alkenes, such as polyethylene, polypropylene, polyisobutylene or ethylenepropylene copolymer; polymerized acrylyl and alkacrylyl compounds such as acrylic, chloroacrylic and methacrylic acids, anhydrides, esters, nitriles and amides, for example, acrylonitrile, ethyl or butyl acrylate, methyl or ethyl methacrylate, methoxymethyl or 2-(2-butoxyethoxy)ethyl methacrylate,2-(cyano-ethoxy) ethyl 3-(3-cyanopropoxy)propyl acrylate or methacrylate, 2-(diethylamino)ethyl or 2-chloroethyl acrylate or methacrylate, acrylic anhydride or methacrylic anhydride; methacrylamide or chloroacrylamide, ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro-1-fluoroethylene polyvinyl alcohol; the vinyl carboxylates such as vinyl acetate, vinyl chloroacetate, vinyl propionate, and vinyl 2-ethyl-hexanoate; the N-vinyl imides such as N-vinylphthalimide and N-vinylsuccinimide; the N-vinyllactams such as N-vinylcaprolactam and N-vinylbutyrolactam; the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrrolidone, vinylfuran or vinylthiophene; the vinyl or vinylidene ketones such as methyl vinyl ketone or isopropenyl ethyl ketone; vinylidene cyanide; etc. Homopolymers of the above compounds or copolymers or terpolymers thereof are beneficially modified by the present phosphonic anhydrides. Examples of such copolymers or terpolymers are those obtained by polymerization of the following monomer mixtures: vinyl chlorine-vinyl acetate, acrylonitrile-vinylpyridine, styrene-methyl methacrylate; styrene-N-vinylpyrrolidone, cyclohexyl methacrylate-vinyl chloroacetate, acrylonitrile-vinylidene cyanide, methyl methacrylate-vinyl acetate, ethyl acrylate-methacrylamide-ethyl chloroacrylate, vinyl chloride-vinylidene chloride-vinyl acetate, etc.

Other presently employed polymers of compounds having the ethylenic group, $>C=C<$ are the homopolymers, copolymers and terpolymers of the α,β-olefinic dicarboxylic acids and the derivatives thereof such as the anhydrides, esters, amides, nitriles and imides, e.g., methyl, butyl, 2-ethylhexyl or dodecyl fumarate or maleate, maleic, chloromaleic, citraconic or itaconic anhydride, fumaronitrile, dichlorofumaronitrile or citracononitrile, fumaramide, or maleamide; maleimide or N-phenylmaleimide, etc. Examples of particularly useful copolymers and terpolymers prepared from the α,β-olefinic dicarboxy compounds are the copolymers of maleic anhydride and a vinyl compound such as ethylene, propylene, isobutylene, styrene, α-methylstyrene, vinyl acetate, vinyl propionate, methyl isopropenyl ketone, isobutyl vinyl ether, etc., the copolymers of dialkyl fumarate such as ethyl or butyl fumarate and a vinyl compound such as styrene, vinyl acetate, vinylidene chloride, ethyl methacrylate, acrylonitrile,etc.

Readily and advantageously modified by the present invention phosphine oxide anhydrides are also the polymers and copolymers of unsaturated, cyclic esters of carbonic acid, e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Readily and advantageously modified by the present invention phosphine oxide anhydrides are also the polyarylcarbonate polymers such as the linear polyarylcarbonates formed from diphenols or dihydroxy aromatic compounds including single and fused-ring nuclei with two hydroxy groups as well as monohydroxy-substituted aromatic residues joined in pairs by various connecting linkages. Examples of the foregoing include dihydroxy benzenes, naphthalenes and the like, the dihydroxydiphenyl ethers, sulfones, alkanes [bis(4-hydroxyphenyl) 2,2-propane], ketones and the like.

Advantageously modified by the present invention phosphine oxide anhydrides are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene and linear copolymers or terpolymers such as butadiene-acrylonitrile copolymer, isobutylene-butadiene copolymer (butyl rubber) butadiene-styrene copolymer of 2-chlorobutadiene-vinylidene cyanide-acrylonitrile terpolymer; esters of saturated di- or polyhydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinylbenzene, as well as the cross-linked polymeric materials such as methyl methacrylate-diallyl methacrylate copolymer or butadiene-styrene-divinylbenzene terpolymer.

Polymerized materials prepared by subsequent reaction of the preformed vinyl polymers, e.g., polyvinyl alcohol, the polyvinyl acetals such as polyvinyl formal or polyvinyl butyral, or completely or partially hydrolyzed polyacrylonitrile are likewise modified in properties by the present invention phosphine oxide anhydrides to give polymeric materials of enhanced utility.

Polymeric materials with which the present invention phosphine oxide anhydrides can be employed as adjuvants are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylene sulfonic acid and its salts, esters and amides, and sulfonated polystyrene; the olefin-sulfur dioxide polymers, the phosphines, phosphites, phosphates and phosphonates such a diphenylvinylphosphine, allyl phosphite and methallyl phosphite, ethylene phosphonic acid and styrene-phosphonic acids, and their salts, esters and amides; the silanes such as dimethylvinylsilane, diphenylvinylsilane and methylphenylvinylsilane, etc.

A class of synthetic polymeric materials with which the present invention phosphine oxide anhydrides are very useful comprises the cellulose derivatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The phosphine oxide anhydrides may be incorporated into films of such cellulose derivatives by adding them to the solutions from which the films are cast or into the melts from which the fibers are extruded.

The present invention phosphine oxide anhydrides are particularly suited to the modification of liquid resin compositions of the polyester type, e.g., the linear polyesters which are obtained by the reaction of one or more polyhydric alcohols with one or more $\alpha,\beta$-unsaturated polycarboxylic acids alone or in combination with one or more saturated polycarboxylic acid compounds, or the cross-linked polyester resins which are obtained by reacting the linear polyester with a compound containing a $CH_2=C<$ group.

The cross-linking component of the present modified polyester resin may be, e.g., styrene, the nuclear or side-chained substituted styrenes such as 3,4-dichlorostyrene, $\alpha$-chloro-styrene, $\alpha$-methylstyrene; other vinyl-substituted hydrocarbons such as $\alpha$- or $\beta$-vinylnaphthalene or 4-vinylbiphenyl; the olefinic carboxylic acids and the esters, nitriles, amides and anhydrides thereof such as acrylic acid, methacrylic acid, ethyl acrylate, or acrylonitrile; the vinyl esters such as vinyl acetate or vinyl chloroacetate; the olefinic ketones such as ethyl vinyl ketone and isopropenyl methyl ketones; the alkenes such as isobutylene and 2-pentene; the olefinic ethers such as vinyl ethyl ether and vinyl isobutyl ether; etc.

The epoxy resins are another class of polymeric materials with which the present invention phosphine oxide anhydrides are compatible and are advantageously used. These resins are condensation products formed by the reaction of a polyhydroxy compound and epichlorohydrin, which condensation products are subsequently cured by addition of cross-linking agents. The hydroxy compound may be e.g., ethylene glycol, 4,4'-isopropylidenediphenol, etc. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine.

The polyurethanes comprise another class of polymeric materials which are beneficially modified by the present invention phosphine oxide anhydrides. The polyurethanes, like the above mentioned polyesters, are commercial materials which are employed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and a compound having a molecular weight of at least 500 and preferably about 1500–5000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkylene ethers having at least 2 hydroxy groups, polythioether glycols, polyesteramides, etc.

The polyesters of polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di-($\beta$-hydroxyethyl)ether, etc., and/or amino-alcohols such as ethanolamine, 3-aminopropanol, 4-aminopropanol, 5-aminopentanol-1, 6-aminohexanol, 10-aminodecanol, 6-amino-5-methylhexanol-1, p-hydroxymethylbenzylamine, etc.; and with mixtures of the above polyalcohols and amines, ethylene diamine, hexamethylene diamine, 3-methylhexamethylene diamine, decamethylene diamine and m-phenylenediamine, etc. and/or amino-alcohols, etc. In the esterification, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol-2,3, butylene glycol-1,3,2-methylpentanediol - 2,4,2 - ethylhexanediol-1,3, hexamethylene glycol, styrene glycol and decamethylene glycol, etc., and di-ethylene glycol, triethylene glycol, tetraethylene glycol, poythioethylene glycol, polyethylene glycols 200, 400 and 600 etc., dipropylene glycol, tripropylene glycol, trithiopropylene glycol, polypropylene glycols 400, 750, 1,200 and 2,000 etc.

Broadly, any of the polyesters, polyisocyanate- modified polyesters, polyesteramides, polyisocyanate-modified polyesteramides, alkylene glycols, polyisocyanate-modified alkylene glyocls, polyoxyalkylene glycols and polyisocyanate-modified polyalkylene glycols, etc. having free reactive hydrogen atoms, free reactive carboxylic and/or especially hydroxyl groups may be employed for the production of the polyurethanes. Moreover, any organic compound containning at least two radicals selected from the class consisting of hydroxyl and carboxyl groups may be employed.

The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form such as the bisphenyl carbamates to toluylene diisocyanate, p,p'-diphenylmethane diisocyanate, p-phenylene diisocyanate and 1,5-naphthalene diisocyanate, etc.

For preparation of the flame-retardant polyurethanes, the present invention phosphine oxide anhydrides are preferably added to a mixture of the reactants and catalyst before hardening. The hardened molded pieces or forms are rendered flame-retardant by the inclusion therein of the phosphine oxide anhydride in quantities of from about 2% to 25% by weight of the polyurethane. Use of the present invention phosphine oxide anhydrides in the polyurethane foams can also, in some applications, improve the mechanical properties of the foams.

Phenolic resins are also beneficially modified by the present invention phosphine oxide anhydrides which compounds can be incorporated into the resin either by milling in molding applications or by addition to film-forming or impregnating and bonding solutions previous to casting. Phenolic resins with which the present invention compounds are employed are, for example, the phenolaldehyde resins prepared from phenols such as phenol, cresol, xylenol, resorcinol, 4-butylphenol, 4-phenylphenol, and aldehydes such as formaldehyde, acetaldehyde, or butyraldehyde in the presence of either acidic or basic catalysts, depending upon whether the resin is intended for use as a molding or extruding resin or as the resin base in coating and impregnating compositions.

The aminoplasts comprise another group of aldehyde resins which are beneficially modified by the present invention phosphine oxide anhydrides. Examples thereof are the heat-convertible condensation products of an aldehyde with urea, thiourea, guanidine, cyanimide, dicyandiamide, alkyl or aryl guanamines, and the triazines such as melamine, 2-chloro-4,6-diamino-1,3,5-triazine and 2-hydroxy-4,6-diamino-1,3,5-triazines. The present adjuvants are compatible with the aminoplasts; and depending upon the quantity of phosphonic anhydride used, they serve to modify their physical properties as well as to render them fire-retardant. When the aminoplasts are destined for use as impregnating agents, bonding adhesives, coatings and casting of films, the phosphine oxide anhydrides are incorporated into solutions or suspensions in which the aminoplast is carried. The resulting mixtures give strong, fire-retardant laminates when sheets of paper, glass, cloth or fabric are impregnated therewith and cured.

Also beneficially modified by the present invention phosphine oxide anhydrides are the nylons, i.e., the superpolyamides which are generally obtained by the condensation of a diamine, e.g., hexamethylenediamine with a dicarboxylic acid, e.g., adipic acid. Depending upon the quantity of phosphine oxide anhydride employed and the individual nature of the compound, there are obtained flame-retardant and/or dye receptor effects.

Other polyamides with which the present invention phosphine oxide anhydrides are beneficially employed, e.g., for improvement in reduced burning rates, are the polypeptides which may be prepared, e.g., by reaction of N-carbobenzyl oxyglycin with glycine or a mixture of glycine and lysine, or an N-carboxy amino acid anhydride such as N-carboxy-DL-phenylalanine anhydride; the polymeric lactams, e.g., polycaprolactam, piperidone, 2-oxohexamethyleneimine and other cyclic amides. The present invention phosphine oxide anhydrides can be incorporated into molding or extruding compositions for flame-retardant effect and/or to modify the physical properties of such compositions.

The present invention phosphine oxide anhydrides are also advantageously employed as adjuvants for polymeric aldehydes, e.g., homopolymeric, high-molecular weight formaldehyde.

The present invention phosphine oxide anhydrides are also adjuvants for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4-aminobutyric acid or 6-aminocaproic acid; the polyanhydrides which are formed by the self-condensation of di-carboxylic acids such as sebacic acid or adipic acid, etc. The present invention phosphine oxide anhydrides are flame-retardants for such self-condensation products, generally; and where transparentizing effect and dye receptivity are lacking, the phosphoric anhydride are often instrumental in ameliorating such deficiencies.

The utility per se of the novel polymers of the present invention is that of any plastic application. For example, these polymers when molded have found excellent application as durable toys for small children and which have the added feature of being fire retarded; thus, a safety item. The novel polymers also have found application as fire retarded plastic furniture; and fire retarded plastic molding, for example, for home and apartment construction.

Other applications of the novel polymers include those utilities of plastics are disclosed in the Reinholdt Plastics Applciation Series, including the books (1) "Polyester Resins" by Lawrence, copyrighted 1960 by Reinholdt Publishing Corporation (R.P.C.); (2) "Polyamide Resins" by Floyd, copyrighted 1958 by R.P.C.; (3) "Epoxy Resins" by Skeist, copyrighted 1958 by R.P.C.; (4) "Vinyl Resins" by Smith, copyrighted 1958 by R.P.C.; (5) "Acrylic Resins," copyrighted 1960 by R.P.C.; and (6) "Polycarbonates" by Christopher and Fox, copyrighted 1962 by R.P.C. All of these publications are incorporated herein by reference.

The following examples are presented to illustrate the invention, with parts and percentages by weight being used in the examples unless otherwise indicated. All polymeric compositions illustrated in the following examples will exhibit reduced burning rates and can be classified as either non-burning or self-extinguishing.

EXAMPLE I

A copolymeric composition is obtained by heating about 0.15 mol of ethylene diamine and about 0.5 mol of tri(methylphosphonyl) phosphine oxide anhydride in propyl sulfone to about 80° C. for about 4 hours. The reaction batch is cooled to room temperature and the propyl sulfone distilled off yielding a polymeric composition which softens at about 250–280° C.

EXAMPLE II

A copolymeric composition is also obtained by blending about 0.3 mol of hexamethylene diamine and about 0.1 mol of an indicated phosphine oxide anhydride compound, and heating the mixture for 3 hours at about 150° C. and thereafter cooling to room temperature. The added phosphine oxide anhydride compounds are:

(1) tri(methylphosphonyl) phosphine oxide anhydride
(2) anhydride of dodecyl di(methylphosphonyl) phosphine oxide
(3) anhydride of tetradecyl di(methylphosphonyl) phosphine oxide (4) anhydride of ethylene tetra(methylphosphonyl) bis(phosphine oxide)
(5) anhydride of hexamethylene tetra(methylphosphonyl) bis(phosphine oxide)

EXAMPLE III

A copolymeric composition is also obtained by blending about 0.3 mol of ethylene glycol and about 0.1 mol of an indicated phosphine oxide anhydride compound and then heating the mixture at 90° C. for about 1 hour. Upon cooling to room temperature the composition sets to a solid polymeric composition. The added phosphine oxide anhydride compounds are:

(1) tri(methylphosphonyl) phosphine oxide anhydride
(2) anhydride of dodecyl di(methylphosphonyl) phosphine oxide
(3) anhydride of tetradecyl di(methylphosphonyl) phosphine oxide
(4) anhydride of ethylene tetra(methylphosphonyl) bis(phosphine oxide)
(5) anhydride of hexamethylene tetra(methylphosphonyl) bis(phosphine oxide)

EXAMPLE IV

A copolymeric composition is obtained by dissolving about 5.2 parts of tri(methylphosphonyl) phosphine oxide anhydride in about 110 parts of dimethyl formamide at a reflux temperature of about 125° C., and adding about 3.5 parts of hexamethylene diamine to the solution under refluxing. The polymeric composition precipitates from the solution in the form of a solid material and after cooling to room temperature is removed from the dimethyl formamide solution.

EXAMPLE V

A polymeric composition is obtained by blending 41 parts of oleic acid, 21 parts of glycerine, 18 parts of an indicated phosphine oxide anhydride compound, and a trace of toluene sulfonic acid and heating the mixture to about 140° C. under a flowing nitrogen blanket sufficient to exclude air and to remove by-product water. After about 30 minutes gelation occurs and the batch is cooled to room temperature to yield a solid polymeric composition. The added phosphine oxide anhydride compounds are:

(1) tri(methylphosphonyl) phosphine oxide anhydride
(2) anhydride of dodecyl di(methylphosphonyl) phosphine oxide
(3) anhydride of hexamethylene tetra(methylphosphonyl) bis(phosphine oxide)

EXAMPLE VI

This example illustrates the preparation of a rigid polyurethane foam using one of the indicated phosphine oxide anhydrides therein as the flame-retardant.

| Ingredients: | Parts |
| --- | --- |
| Methyl glucoside based polyol | 100.0 |
| Trichloromonofluoromethane | 35.0 |
| "Silicone Y–4316" | 2.0 |
| Tetramethylbutane diamine | 1.5 |
| Phosphine oxide anhydride | 11.0 |
| Polyisocyanate "Mondur MR" | 108.0 |

Notes (1) "Silicone Y–4316" is a trademark name for a silicon foam stabilizer sold by Union Carbide.
(2) Phosphine oxide anhydride:
  (a) tri(methylphosphonyl) phosphine oxide anhydride
  (b) anhydride of tetra decyl di(methylphosphonyl) phosphine oxide
  (c) anhydride of hexamethylene tetra(methylphosphonyl) bis(phosphine oxide)
(3) Polyisocyanate "Mondur MR"—a polymethylene polyphenylisocyanate having an available NCO content of about 32% and a viscosity at 25° C. of 200±50 cps.

For the above formulation, all of the components except the polyisocyanate are blended to a homogeneous mixture, and then the polyisocyanate is added, the mixture blended thoroughly, and then is allowed to polymerize and rise.

EXAMPLE VII

A composition is also obtained by adding one of the indicated phosphine oxide anhydride compounds in an amount sufficient to be about 10% by weight based on the weight of the total solids content of a 10% propyl sulfone solution of a 72:28 molar ratio styreneacrylonitrile copolymer. The benzene is distilled off yielding a polymeric composition. The added phosphine oxide anhydride compounds are:

(1) tri(methylphosphonyl) phosphine oxide anhydride
(2) anhydride of phenyl di(methylphosphonyl) phosphine oxide
(3) anhydride of cyclohexyl di(methylphosphonyl) phosphine oxide

EXAMPLE VIII

To a polymer blend of an unsaturated polyester prepared by condensing one mol of an indicated phosphine oxide oxide anhydride, ½ mol of maleic anhydride, ½ mol of phthalic anhydride and 2.1 mols of propylene glycol to an acid number of about 40 at 200° C., cooling the mixture and dissolving the mixture in a sufficient amount of styrene monomer so that the resulting mixture comprises 30 parts styrene monomer to 70 parts of polyester, there is added a small amount (3% w./w.) of benzoyl peroxide and the resulting mixture is polymerized at 80° C. yielding a thermo-setting resin. The added phosphine oxide anhydride compounds are:

(1) tri(methylphosphonyl) phosphine oxide anhydride
(2) anhydride of dodecylphenyl di(methylphosphonyl) phosphine oxide
(3) anhydride of trimethylene tetra(methylphosphonyl) bis(phosphine oxide).

EXAMPLE IX

To a granular blend of a polystyrene and butadienestyrene copolymer containing about 6% by weight of the copolymer there is added one of the indicated phosphine oxide anhydride compounds in an amount of about 4% by weight by blending for 15 minutes in a tumbling type laboratory blender and then extruding the blend into rods. The added phosphine oxide anhydride compounds are:

(1) tri(methylphosphonyl) phosphine oxide anhydride
(2) anhydride of methyl di(methylphosphonyl) phosphine oxide

EXAMPLE X

To melted samples of a natural high molecular weight low density polyethylene having a density of about 0.9, a melt index of about 0.3 gm./10 min., a softening temperature of about 105° C., and a tensile strength (ultimate) of 2300 p.s.i.g., various amounts of one of the indicated phosphine oxide anhydrides sufficient to make compositions wherein the added anhydride comprises from about 4 to 8% of the total weight of the composition are added. The samples are cooled to room temperature to provide polymer compositions. The added phosphine oxide anhydride compounds are:

(1) tri(methylphosphonyl) phosphine oxide anhydride
(2) anhydride of hexyl di(methylphosphonyl) phosphine oxide
(3) anhydride of ethylene penta(methylphosphonyl) tris(phosphine oxide)

EXAMPLE XI

To a 5% solution of a polyvinyl formal in ethylene dichloride there is added one of the indicated phosphine oxide anhydride compounds in a quantity which is about 20% by weight of the total solids content of the solution. Films are cast from such solutions and then air dried for about 24 hours. The added phosphine oxide compounds are:

(1) tri(methylphosphonyl) phosphine oxide anhydride
(2) anhydride of triethylene hexa(methylphosphonyl) tetrakis(phosphine oxide)

EXAMPLE XII

Improved films are also obtained when one of the indicated phosphine oxide anhydride compounds is added to a 10% solution of a 50:50 molar ratio styrene-methyl methacrylate copolymer in dimethyl formamide in an amount sufficient to be about 30% by weight of the total solids content and then cast into films which are flexible. The added phosphine oxide anhydride compounds are:

(1) tri(methylphosphonyl) phosphine oxide anhydride
(2) anhydride of butyl di(methylphosphonyl) phosphine oxide

EXAMPLE XIII

With about 3 parts of a commercially available condensation product of linoleic acid and a polyamine having an amine value of from 290–320 and a viscosity of 80–120 poises at 40° C., there is mixed 7 parts of diglycidyl ether of Bisphenol A and a sufficient amount of one of the indicated phosphine oxide anhydrides to make a composition having about 16% by weight, based on the weight of the total composition of the phosphine oxide anhydride. The resulting reaction mixture is poured into a small aluminum pan (coated with a silicone grease to prevent sticking) and heated in an oven at 100° C. for about 2 hours. After cooling to room temperature an epoxy resinous product is obtained. The added phosphine oxide anhydride compounds are:

(1) tri(methylphosphonyl) phosphine oxide anhydride
(2) anhydride of dodecyl di(methylphosphonyl) phosphine oxide
(3) anhydride of tri(ethylidene phosphonyl) phosphine oxide

EXAMPLE XIV

To samples of a commercial cellulose acetate butyrate having an average acyl content of 13% and 37% butyryl and a viscosity range of 17–33 seconds (64–124 poises) as determined by ASTM method D–1343–54T in the solution described as Formula A, ASTM method D–871–54T are blended on hot mill rolls a sufficient amount of one of the indicated phosphine oxide anhydrides such that the final compositions contain from about 10 to 15% by weight of the added phosphine oxide anhydrides. After blending the samples are cooled to room temperature to obtain a polymeric composition. The added phosphine oxide anhydrides are:

(1) tri(methylphosphonyl) phosphine oxide anhydride
(2) anhydride of hexadecyl di(methylphosphonyl) phosphine oxide
(3) anhydride of phenylethyl di(methylphosphonyl) phosphine oxide.

EXAMPLE XV

To a 10% ethylene dichloride solution of polyvinyl acetate there is added one of the indicated phosphine oxide anhydride compounds in a quantity which is ½ by weight to that of the polyvinyl acetate present in the solution. Films cast from the resulting mixture are flexible. The added phosphine oxide anhydride compounds are:

(1) tri(methylphosphonyl) phosphine oxide anhydride
(2) anhydride of octyl di(methylphosphonyl) phosphine oxide
(3) anhydride of ethylene tetra(methylphosphonyl) bis (phosphine oxide)

EXAMPLE XVI

To melted samples of a commercial rigid polymethyl methacrylate polymer there is blended on hot mill rolls one of the indicated phosphine oxide anhydrides in an amount sufficient to provide about 20% of the anhydride per total weight of the composition. The samples are milled into sheets in order to obtain polymeric compositions. The added phosphine oxide anhydrides are:

(1) tri(methylphosphonyl) phosphine oxide anhydride
(2) anhydride of oleyl di(methylphosphonyl) phosphine oxide
(3) anhydride of hexamethylene tetra(methylphosphonyl) bis(phosphine oxide).

EXAMPLE XVII

To 100 parts of a polyvinyl chloride resin there is added 50 parts of dioctyl phthalate and 52 parts of tri-(methylphosphonyl) phosphine oxide anhydride. The mixture is placed on hot mill rolls and blended. When thoroughly blended, the product is stripped from the rolls and pressed into square shaped pieces which are soft pliable plastic.

EXAMPLE XVIII

A salt is prepared from hexamethylene diamine and adipic acid by mixing about 144 parts of amine with about 150 parts of the acid in the presence of 1300 parts of 95% ethyl alcohol and 210 parts of water. The mass is warmed until complete solution occurs and then cooled to obtain crystals of hexamethylene diammonium adipate. To this salt is added about 18 parts of tri(methylphosphonyl) phosphine oxide anhydride and the mixture heated for about three hours with an equal weight of mixed xylenols (B.P. 218–222° C.) and the entire reaction mass is then poured gradually with stirring into a large volume of ethyl alcohol. The modified polyamide precipitates as a granular powder and is filtered, washed with alcohol and dried.

EXAMPLE XIX

The various polymers prepared in the aforegoing Examples I through XVIII and which contain the full anhydrides are each individually subjected to the burn test, ASTM–D1692–D59T, heretofore described. In all cases, the polymers are found to either demonstrate no evidence of burning or to be "self-extinguishing." The same organic compositions which do not contain the full anhydrides are utilized as the control materials and are tested in the same manner. These "control materials" are found in all cases to either burn or go beyond the "second gauge line," i.e., they do not exhibit "self-extinguishing" characteristics as defined by said test. Thus the fire retardancy of the present invention polymers is vividly demonstrated.

EXAMPLE XX

The various polymers prepared in the aforegoing Examples I–XVIII, and which contain the full anhydrides, are molded into 3" x 3" x 3" hollow blocks which are suitable for a child's play block. These individual blocks are found to be durable in such capacity over at least one month's period, in addition to being fire retarded.

What is claimed is:

1. A polymer comprising (1) a reactive hydrogen-containing material selected from the group consisting of polyhydric compounds and polyamine compounds copolymerized with (2) a full anhydride of an organo-alkylidene phosphonyl phosphine oxide having the formula:

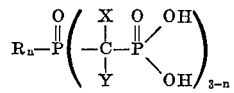

wherein $n$ is an integer 0 to 1, X and Y are selected from the group consisting of hydrogen and alkyl groups containing from 1 to 6 carbon atoms, and R is selected from the group consisting of hydrogen, aliphatic, aryl, alkaryl, aralkyl, alicyclic and

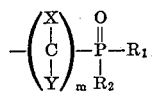

$m$ is an integer from 1 to 10, $R_1$ and $R_2$ are each selected from the group consisting of hydrogen, alkyl groups containing from 1 to 6 carbon atoms,

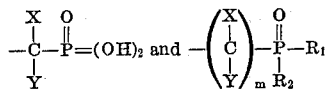

and R does not contain over 6 phosphine oxide moities; said anhydride characterized by exhibiting an increase in the melting point over the corresponding acid form of the organo-alkylidene phosphonyl phosphine oxide and being present in an amount of from about 0.1% to about 50% by weight based on the total weight of said polymer.

2. A process for preparing the co-polymer of claim 1 which comprises reacting said reactive hydrogen-containing material with said anhydride at temperatures above about 40° C. in an amount of a phosphonic anhydride group to a reactive hydrogen ratio of from about 1:10 to 10:1.

3. A process according to claim 2, wherein said amount is about one phosphonic anhydride group per reactive hydrogen.

4. A polymer according to claim 1, wherein said anhydride is an anhydride of a tri(lower alkylidene phosphonyl) phosphine oxide having the formula:

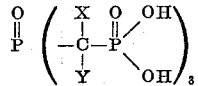

wherein X and Y are selected from the group consisting of hydrogen and alkyl groups containing from 1 to 6 carbon atoms.

5. A polymer according to claim 4, wherein said polymer is a copolymer of a polyhydric compound and an anhydride having the formula:

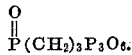

6. A polymer according to claim 4, wherein said polymer is a copolymer of a polyamine and an anhydride having the formula:

$$\overset{O}{\underset{\|}{P}}(CH_2)_3P_3O_6.$$

7. A polymer according to claim 1, wherein said anhydride is an anhydride of an alkyl di(lower alkylidene phosphonyl) phosphine oxide having the formula:

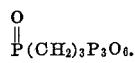

wherein X and Y are selected from the group consisting of hydrogen and alkyl groups containing from 1 to 6 carbon atoms and R is an alkyl group containing from 1 to 20 carbon atoms.

8. A polymer according to claim 7, wherein said anhydride is an anhydride of dodecyl di(methyl phosphonyl) phosphine oxide.

9. A polymer according to claim 7, wherein said anhydride is an anhydride of tetradecyl di(methyl phosphonyl) phosphine oxide.

10. A polymer according to claim 1, wherein said anhydride is an anhydride of an alkylene tetra(methyl phosphonyl) bis(phosphine oxide) having the formula:

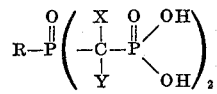

wherein $n$ is an integer from 1 to 10 inclusive.

11. A polymer according to claim 10, wherein said anhydride is an anhydride of ethylene tetra(methyl phosphonyl) bis(phosphine oxide).

12. A polymer according to claim 10, wherein said anhydride is an anhydride of hexamethylene tetra(methyl phosphonyl) bis(phosphine oxide).

References Cited

UNITED STATES PATENTS 3,395,113   7/1968   Irani et al. _____ 260—2
3,576,783   4/1971   Kerst _____ 260—2

SAMUEL H. BLECH, Primary Examiner

U.S. Cl. X.R.

8—115.5; 106—177; 161—191; 260—2.5 AJ, 18 EP, 31.8 R, 32.6 R, 33.8 UA, 45.7 P, 45.8 R, 75 P, 227, 231, 502.4 P, 865, 870, 887, Digest 24